(12) United States Patent
Bly

(10) Patent No.: US 11,154,138 B2
(45) Date of Patent: *Oct. 26, 2021

(54) BICHAMBERED CONVERTIBLE HEADREST COVER WITH PADDED INSERT

(71) Applicant: Allison Brooke Bly, Boise, ID (US)

(72) Inventor: Allison Brooke Bly, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,668

(22) Filed: Mar. 16, 2020

(65) Prior Publication Data

US 2020/0281361 A1  Sep. 10, 2020

Related U.S. Application Data

(63) Continuation of application No. 16/389,345, filed on Apr. 19, 2019, now Pat. No. 10,588,418.

(60) Provisional application No. 62/660,120, filed on Apr. 19, 2018.

(51) Int. Cl.
| | |
|---|---|
| *A47C 7/38* | (2006.01) |
| *A47C 7/62* | (2006.01) |
| *B60N 2/882* | (2018.01) |

(52) U.S. Cl.
CPC .............. *A47C 7/386* (2013.01); *A47C 7/383* (2013.01); *B60N 2/882* (2018.02)

(58) Field of Classification Search
CPC ................................ A47C 7/383; A47C 7/386
USPC ........................................................ 297/220
See application file for complete search history.

(56) References Cited

U.S. PATENT DOCUMENTS

| | | | |
|---|---|---|---|
| 2,589,155 | A | 3/1952 | Smith |
| 2,682,673 | A | 7/1954 | Myers |
| 2,765,480 | A | 10/1956 | Mueller |
| 2,883,682 | A | 4/1959 | Kwake |
| 2,898,609 | A | 8/1959 | Stolle |
| 2,952,856 | A | 9/1960 | Ruff |
| 3,204,678 | A | 9/1965 | Worcester |
| 3,298,044 | A | 1/1967 | Saltness |
| 3,538,508 | A | 11/1970 | Young |
| 3,689,947 | A | 9/1972 | Wolf |
| 3,849,810 | A | 11/1974 | Degen |
| 3,879,775 | A | 4/1975 | Iwata |
| 3,897,777 | A | 8/1975 | Morrison |
| 4,165,125 | A | 8/1979 | Owen |

(Continued)

OTHER PUBLICATIONS

Astar Memory Foam Head rest Car Pillow M139; https://www.amazon.com/Astar-Memory-Foam-Pillow-M139/dp/B002DBS9KM; Dec. 11, 2017.

(Continued)

*Primary Examiner* — Rodney B White
(74) *Attorney, Agent, or Firm* — Burdick Patents, P.A.; Sean D. Burdick

(57) ABSTRACT

A removable headrest cover includes a flexible shroud having an inner chamber and an outer chamber. The inner chamber contains padding and is separated from the outer chamber by an inner panel and the outer chamber is accessible through an outer opening defined through an outer surface of the shroud. The shroud is configured to enclose a chair headrest within the outer chamber, and when removed from the chair, to be rolled or folded into multiple stacked portions the outermost portion of which includes an end segment of the outer opening that can enclose the other rolled or stacked portions within the outer chamber to form a pillow.

20 Claims, 9 Drawing Sheets

(56) References Cited

U.S. PATENT DOCUMENTS

| | | | |
|---|---|---|---|
| 4,227,270 | A | 10/1980 | Rivera |
| 4,247,963 | A | 2/1981 | Reddi |
| 4,274,673 | A | 6/1981 | Kifferstein |
| 4,309,784 | A | 1/1982 | Cohen |
| 4,389,742 | A | 6/1983 | DeWitt |
| 4,535,878 | A | 8/1985 | Grahl |
| 4,550,458 | A | 11/1985 | Fiore |
| 4,679,263 | A | 7/1987 | Honer |
| 4,688,286 | A | 8/1987 | Miker |
| 4,689,844 | A | 9/1987 | Alivizatos |
| 4,724,560 | A | 2/1988 | Christie |
| 4,725,094 | A | 2/1988 | Greer |
| 4,780,921 | A | 11/1988 | Lahn et al. |
| 4,815,154 | A | 3/1989 | Grimes |
| 4,843,662 | A | 7/1989 | Handelman |
| 4,862,536 | A | 9/1989 | Pruit |
| 4,864,669 | A | 9/1989 | Jones |
| 4,877,288 | A | 10/1989 | Lee |
| 4,928,336 | A | 5/1990 | Petillo, Sr. |
| 4,959,880 | A | 10/1990 | Tesch |
| 5,066,001 | A | 11/1991 | Wilkinson |
| 5,138,728 | A | 8/1992 | Aston |
| 5,168,590 | A | 12/1992 | O'Sullivan |
| 5,240,330 | A | 8/1993 | Thompson |
| 5,378,042 | A | 1/1995 | Daneshvar |
| 5,522,105 | A | 6/1996 | Fujiwara |
| 5,538,323 | A | 7/1996 | Henkel |
| 5,567,015 | A | 10/1996 | Arias |
| 5,572,757 | A | 11/1996 | O'Sullivan |
| 5,629,071 | A | 5/1997 | Feldman |
| 5,652,983 | A | 8/1997 | Kraemer |
| 5,802,643 | A | 9/1998 | Sloot |
| 5,829,829 | A | 11/1998 | Celestina-Krevh |
| 5,864,904 | A | 2/1999 | Rudick |
| 5,918,332 | A | 7/1999 | Dees |
| 5,953,777 | A | 9/1999 | Buck |
| 5,961,018 | A | 10/1999 | Abelbeck |
| 5,987,676 | A | 11/1999 | Littleford |
| 6,009,577 | A | 1/2000 | Day |
| 6,023,798 | A | 2/2000 | Hui |
| 6,216,297 | B1 | 4/2001 | Lemke |
| 6,217,116 | B1 | 4/2001 | Sloot |
| 6,233,767 | B1 | 5/2001 | Horowitz |
| 6,401,279 | B1 | 6/2002 | Vaughn |
| 6,532,611 | B1 | 3/2003 | Day |
| 6,641,220 | B2 | 11/2003 | Clegg |
| 6,668,400 | B1 | 12/2003 | Nichols |
| 6,684,429 | B1 | 2/2004 | Deering |
| 6,748,615 | B1 | 6/2004 | Tiedermann |
| 7,065,814 | B2 | 6/2006 | Rutkowski |
| 7,140,056 | B2 | 11/2006 | Deering |
| 7,441,292 | B2 | 10/2008 | Williams et al. |
| 7,627,916 | B1 | 12/2009 | Gielow |
| 7,644,459 | B1 | 1/2010 | Olson |
| 7,997,646 | B2 | 8/2011 | Resendez |
| 8,245,339 | B2 | 8/2012 | Murray |
| 8,347,431 | B1 | 1/2013 | Cohron, III |
| 8,607,382 | B1 | 12/2013 | Cohron, III |
| 8,668,270 | B2 | 3/2014 | Ciepiela |
| 8,708,414 | B2 | 4/2014 | Hurwitz |
| 9,051,169 | B2 | 6/2015 | Pearce |
| 9,259,091 | B2 | 2/2016 | Freund |
| 9,332,735 | B2 | 5/2016 | Throndsen |
| 9,427,087 | B2 | 8/2016 | Clarke et al. |
| 9,730,535 | B2 | 8/2017 | Martin |
| 9,820,593 | B2 | 11/2017 | Adams |
| 10,123,638 | B2 | 11/2018 | Thorn |
| 10,588,418 | B2 * | 3/2020 | Bly ............... A47C 7/383 |
| 2006/0090975 | A1 | 5/2006 | Brock |
| 2007/0113338 | A1 | 5/2007 | Remblad |
| 2008/0164734 | A1 | 7/2008 | Nile et al. |
| 2015/0061332 | A1 | 3/2015 | Dowell |
| 2015/0115674 | A1 | 4/2015 | Watson |
| 2017/0143124 | A1 | 5/2017 | Pierce |
| 2019/0142182 | A1 | 5/2019 | Watson |
| 2019/0167020 | A1 | 6/2019 | Bice |
| 2019/0290033 | A1 | 9/2019 | Lonstein |
| 2021/0068561 | A1 * | 3/2021 | Adeeb, Jr. ............ A47G 9/10 |

OTHER PUBLICATIONS

Cabeau Evolution Memory Foam Travel Pillow; http://www.amazon.com/Cabeau-Evolution-Memory-Travel-Pillow/dp/B0070XC8U0; Dec. 11, 2017.

https://www.amazon.com/GUSODOR-Breathable-Cushion-Headrest-Comfortable/dp/B06XRTGD2G/ref=sr_1_10?keywords=car+headrest&qid=1558549621&s=gateway&sr=8-10; Dec. 11, 2017.

HealthSmart Portable Headrest Pillow; https://www.homedepot.com/p/HealthSmart-Portable-Headrest-Pillow-554-9100-0000/203156101; Dec. 11, 2017.

Hengjia Premium Therapeutic Grade Neck Support Cushion with Pain Free Guarantee: https://www.amazon.com/HENGJIA-Premium-Therapeutic-Support-Guarantee/dp/B00XYTFI0Q; Dec. 11, 2017.
cushion+headrest+pillow&dz=1C1CHBF_enUS790US790&source-univ&tbrn=shop&tbo=u&sa=X&ved=0ahUKEwjc0q_euq_iAhUQP6wKHUBJD3oQsxgIKw&blw=1904&bih=956; Dec. 11, 2017.

18474.0.18664.32.30.3.3.3.3.275.3888.0j20j5.25.0...0...1c.1.64.psy-ab..7.16.2691...33i299k1j33i10i299k1j33i10k1.0.6YP0-tT10a0#spd=12685324475707893537; Dec. 11, 2017.

Sharper Image Memory Foam Travel Neck Pillow Black, https://www.amazon.com/Sharper-image-Memory-Travel-Pillow/dp/B01N7OKQTX; Dec. 11, 2017.

Wybrance Travel Pillow and Therapeutic Neck Support; https://ideaing.com/product/wybrance-travel-pillow-and-therapeutic-neck-support; Dec. 11, 2017.

* cited by examiner

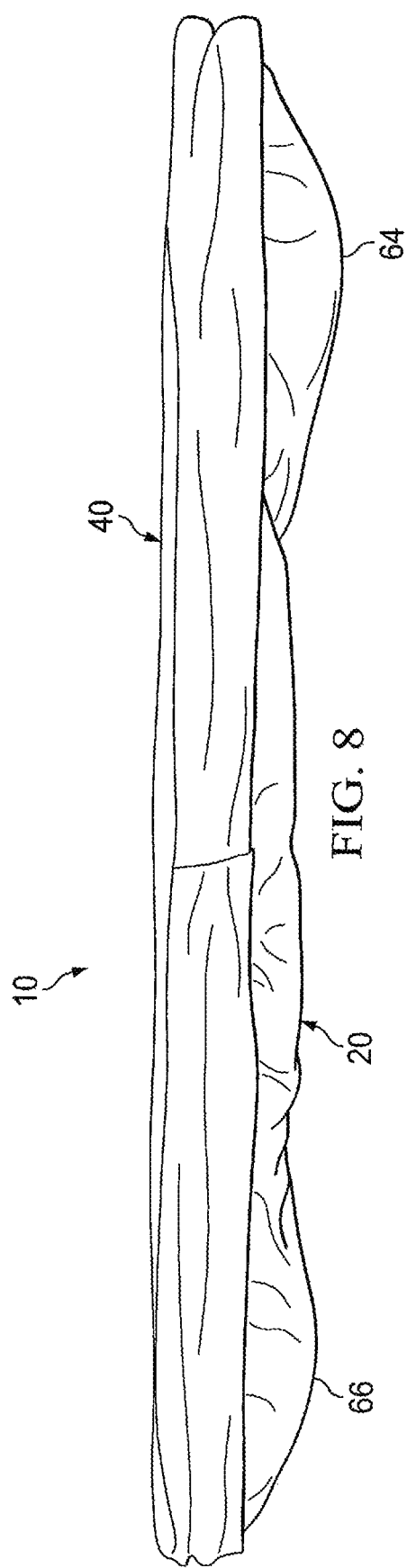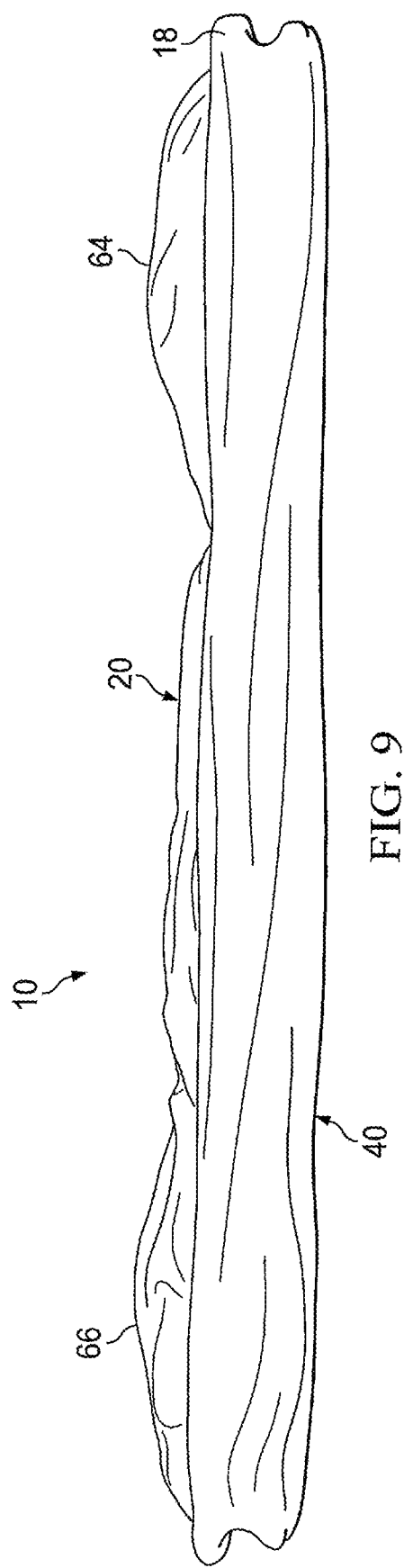

US 11,154,138 B2

BICHAMBERED CONVERTIBLE HEADREST COVER WITH PADDED INSERT

RELATED APPLICATIONS

This application claims priority to U.S. Provisional Application 62/660,120, which was filed on Apr. 19, 2018 and which is fully incorporated herein by reference.

BACKGROUND OF THE INVENTION

Field of the Invention

The present invention relates generally to padded covers for headrests, and more specifically to removable headrest covers for temporary installation on chair tops, and especially on headrests on passenger seats in vehicles.

Description of Related Art

Padded headrests on chairs are well known in the art, for providing comfort and support to a seated individual. Most such headrests are an integral part of the chair, and may not provided the level of comfort desired by a particular user. This is because the padding is usually designed to abut the back of the user's head, and is not equipped to provide support for the user's neck. The discomfort is aggravated in the case of passengers traveling long distances, for example, by car, train, or airplane, where the passenger must remain seated for many hours with inadequate head and neck support.

Some solutions already exist that seek to address this very problem. For example, many seats on American Airlines® passenger planes are equipped with headrests that include padded, adjustable side panels that provide a passenger with head and neck support when the passenger lies her head to the left or right. Other solutions are portable pillow-like devices specifically designed for neck support. One such product is tubular pillow designed for placement between the headrest and the back of the passenger's neck. Another similar product is U-shaped so that during usage, middle part of the U rests behind the passenger's neck and the legs of the U provide support on both sides of the passenger's neck. And of course there are small, conventional pillows made available by most airlines to passengers, to provide a cushion against the window or their fellow passenger.

None of these solutions, however, protect the passenger from coming into contact with headrest residue left behind by a prior passenger. In some cases, the residue may simply be an annoying, albeit benevolent substance such as an oily or sticky film. In other cases, the residue may contain germs left by sick passengers who have coughed or drooled on, or otherwise infected the headrest. What is needed is a portable headrest cover with head and neck support that can be installed and removed by passengers for improved comfort and sanitation.

SUMMARY OF THE INVENTION

The present invention provides a portable headrest cover that can be installed onto the headrest portion of a chair to form a comfortable, protective barrier between the headrest and the head and neck of an individual seated in the chair. When removed from the chair, the headrest cover can be converted into a pillow to provide an alterative means of comfort for the individual or collapsed for easy transport and storage.

In one embodiment according to the invention, a removable headrest cover for installation on a headrest portion of a chair includes a flexible shroud having an inner chamber and an outer chamber. The inner chamber is separated from the outer chamber by an inner panel disposed within the outer chamber, the outer chamber is accessible through an outer opening defined through an outer surface of the shroud, and the inner chamber is accessible through an inner opening defined through the inner panel. Padding is enclosed within the inner chamber. The flexible shroud is configured to enclose within the outer chamber a headrest portion of a passenger seat in a commercial airplane, so that the padding within the inner chamber provides additional comfort to an individual seated there.

In one embodiment of the invention, the removable headrest cover can be collapsed or converted into a pillow. This is made possible by the shroud and padding being made from material such as polyurethane fabric or soft, synthetic rubber that can be easily folded multiple times. For example, the flexible shroud with padded insert may be configured to allow the headrest cover to be folded into a stack of thirds comprising a lower third, a central third, and an upper third wherein each third includes at least a portion of the outer opening and wherein the outer opening is maintained inside the stack, so that the lower third and the central third can be tucked inside the outer opening portion of the upper third, thereby converting the headrest cover into a trifolded pillow.

In another embodiment, the padding can have a size substantially matching the volume of the inner chamber. A pillowcase may be provided to further enclose the padding. The pillowcase may further provide one or more pockets formed on a surface of the pillowcase for containing neck pads. The neck pads can be provided on either side of center, to provide additional neck support. In one embodiment, the neck pads may be dome-shaped and made of a soft, resilient material such as synthetic rubber. The flexible shroud may also include means for closing the inner opening and outer opening, such as zippers or hook-and-loop (Velcro®) fasteners.

In other embodiments, the flexible shroud of the headrest cover may define various shapes and sizes. For example, the headrest cover may have a generally rectangular volume. The flexible shroud may have a length between about 18 inches and about 20 inches, the outer opening or the inner opening may have a length between about 11 inches and about 13 inches, the outer opening may be substantially centered on the outer surface of the shroud, or the inner opening may be substantially centered on the inner panel.

In another embodiment, a bichambered headrest cover according to the invention includes a flexible shroud having an inner chamber and an outer chamber. The inner chamber contains padding and is separated from the outer chamber by an inner panel disposed within the outer chamber. The outer chamber is accessible through an outer opening defined through an outer surface of the shroud. The flexible shroud is configured to enclose a chair headrest within the outer chamber and, when removed from the chair, to be folded into multiple stacked portions and an outermost stacked portion, wherein the outermost stacked portion includes an end segment of the outer opening. The end segment of the outer opening can at least partially enclose the multiple stacked portions within the outer chamber, thereby collapsing the headrest cover into a pillow.

In another embodiment, a bichambered headrest cover includes a flexible shroud having an inner chamber and an outer chamber. The inner chamber contains padding and is separated from the outer chamber by an inner panel disposed within the outer chamber. The outer chamber is accessible through an outer opening defined through an outer surface of the shroud. The flexible shroud is configured to enclose a chair headrest within the outer chamber and, when removed from the chair, to be rolled into a compressed volume that can be tucked into an end segment of the outer opening to form a pillow.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

FIG. 8 is a lower side view of the headrest cover of FIG. 1.

FIG. 9 is an upper side view of the headrest cover of FIG. 1.

DETAILED DESCRIPTION OF THE INVENTION

The present invention provides a portable headrest cover that can be installed onto the headrest portion of a chair to form a comfortable, protective barrier between the headrest and the head and neck of an individual seated in the chair. When removed from the chair, the headrest cover can be converted into a pillow to provide an alterative means of comfort for the individual or collapsed for easy transport and storage.

Figure 1:
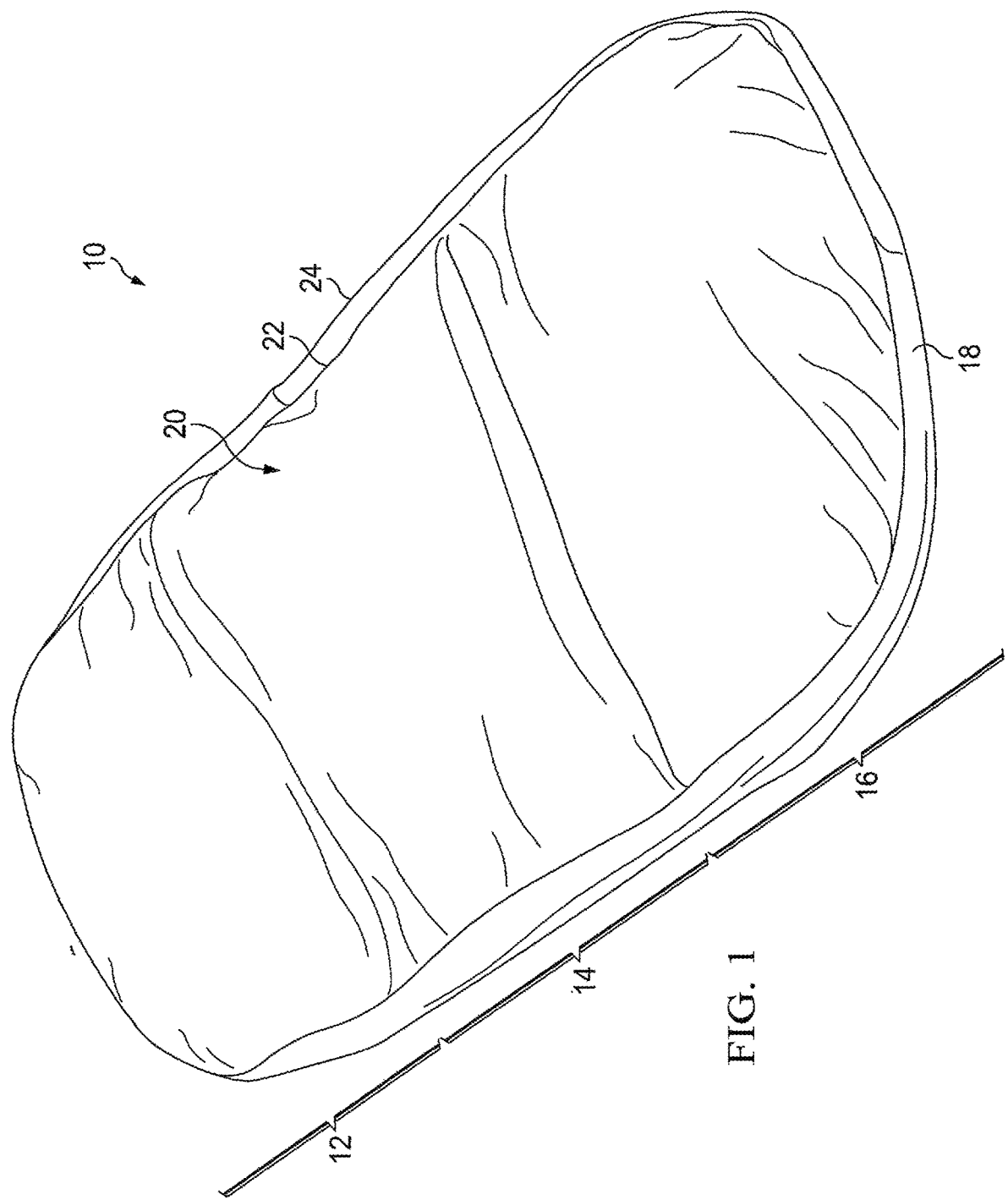
FIG. 1 is a frontal perspective view of one embodiment according to the invention of a bichambered convertible headrest cover with padded insert.

FIG. 1 shows a frontal perspective view of one embodiment according to the invention of a bichambered convertible headrest cover 10 with a padded insert. The headrest cover 10 includes a shroud 20 that is preferably made from a flexible material such as fabric, for example, cotton or polyurethane or other cloth made from natural or synthetic fibers, or a blend of both. The shroud 20 encloses the internal parts of the headrest cover and forms a soft, comfortable surface all around the headrest cover. The shrouded headrest cover may be generally rectangular in shape, as it is preferably intended for use on commercial airline seats that have headrests that are also generally rectangular, although other shapes and applications are possible. Preferably, the material of headrest cover 10 is a machine-washable sterilizable fabric that can be easily manually installed on a headrest by pulling and stretching the headrest cover around the headrest being covered, and that can also be easily manually removed from a headrest using the same method, as a pillowcase is installed to cover a pillow, or as a fitted sheet is installed to cover a mattress.

In one embodiment, the length of the shroud 20 is between about 18 and 20 inches, the height of shroud 20 is between about 8 and 10 inches, and the depth of shroud 20 is between about 2 and 4 inches. The shroud 20 may be fabricated by conventional stitching techniques to create a side wall or panel 18 bordered by a front stitch 22 and a rear stitch 24. The side wall 18 may run partially or completely around the perimeter of the shroud 20. In one embodiment, the headrest cover 10 is formed as a trifoldable headrest cover having a right third 12, a main third 14, and a left third 16. This fractional terminology is a rough approximation used only for purposes of illustration, and does not limit the invention in size or scale.

Figure 2:
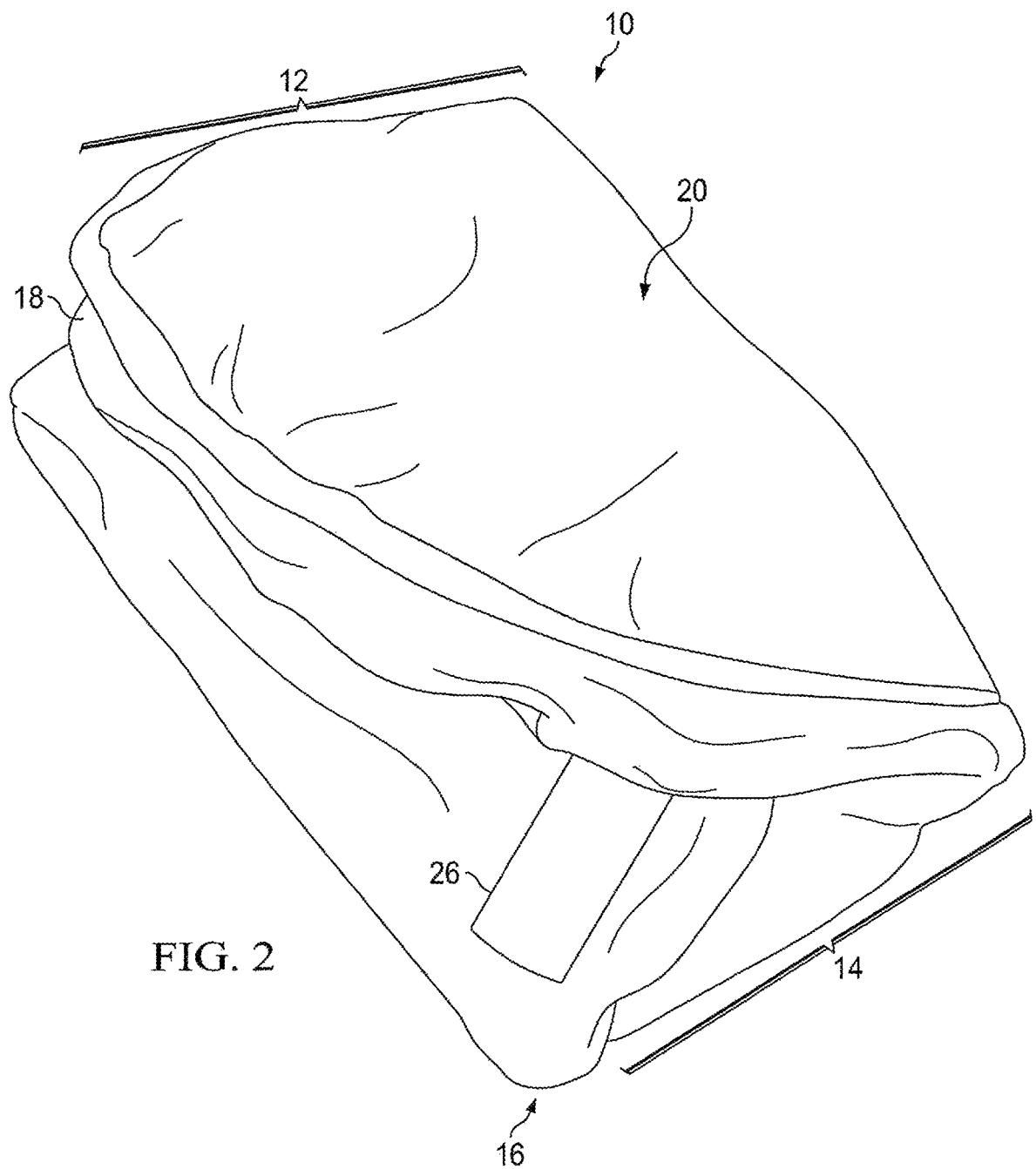
FIG. 2 is a perspective view of the headrest cover of FIG. 1 being trifolded.

FIG. 2 shows a perspective view of the headrest cover 10 being trifolded into a stack of thirds. In this example, the trifold is achieved by tucking or folding the left third 16 inward between the right third 12 and the main third 14. As shown in the figure, the main third 14 is situated on the bottom of the stack, and when so stacked may be referred to herein as the lower third 14. The left third 16 is being situated in the middle of the stack, and when so stacked may be referred to herein as the middle third 16. The right third 12 is being situated on the top of the stack, and when so stacked may be referred to herein as the upper third 12. An optional pull tab 26 may be affixed to the shroud 20 to assist in the stacking and tucking process.

Figure 3:
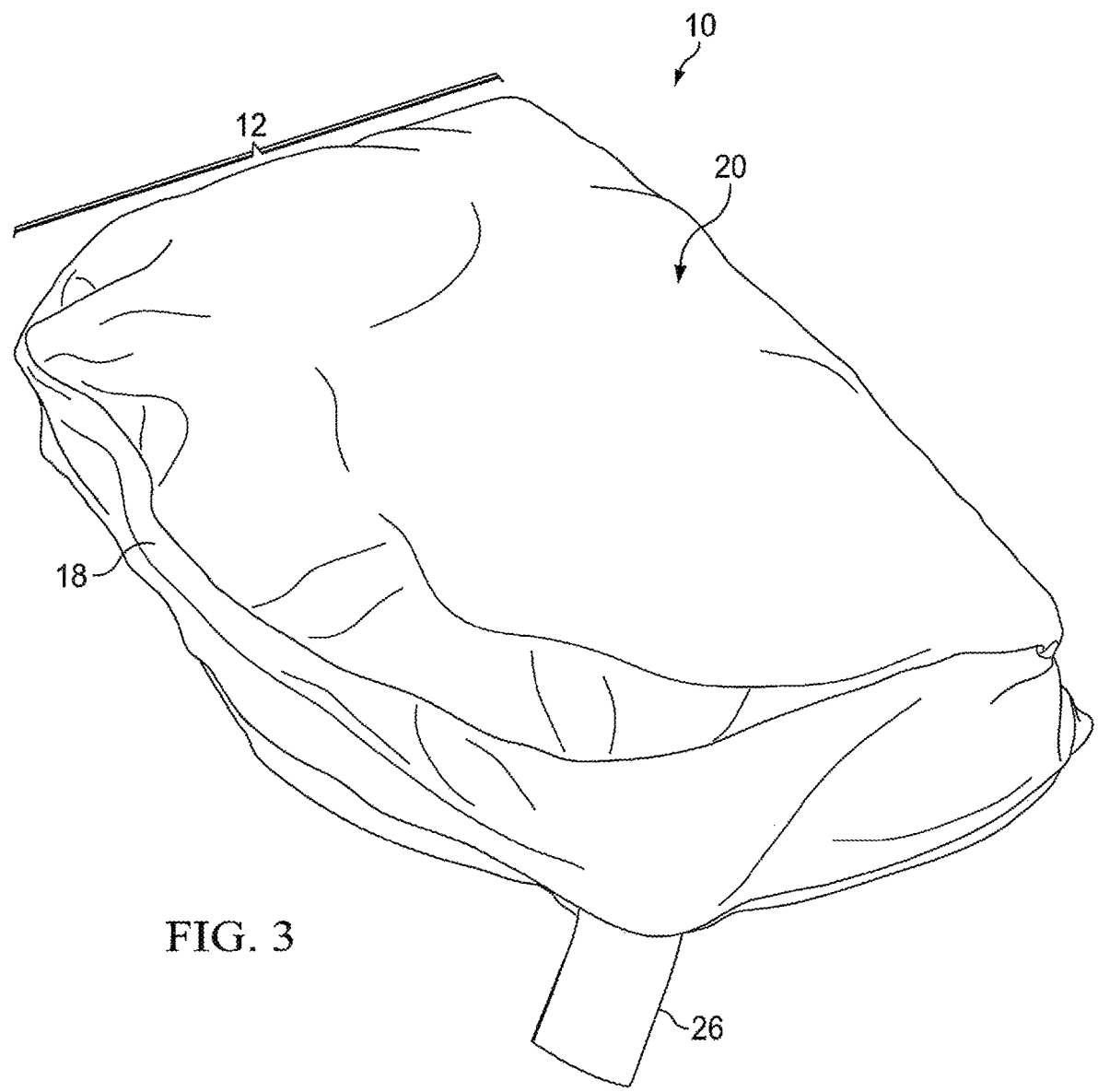
FIG. 3 is a perspective view of the headrest cover of FIG. 1 in a trifolded state, showing lower and middle thirds tucked into a portion of the outer opening of the upper third to form a pillow.

FIG. 3 shows a perspective view of the headrest cover 10 in a fully trifolded (or collapsed) state that forms a pillow. The lower third 14 and middle third 16 have been tucked into a portion of the outer chamber 29 of the upper third 12 to form the pillow. Alternatively, rather than folding the headrest cover 10 into thirds or into some other fractional sections for stacking, embodiments of the invention also allow the headrest cover to be rolled in a longitudinal direction (i.e. along the direction of the seams 28, 30) and the resulting roll tucked into the same portion of the outer chamber 29 to form a pillow.

Figure 4:
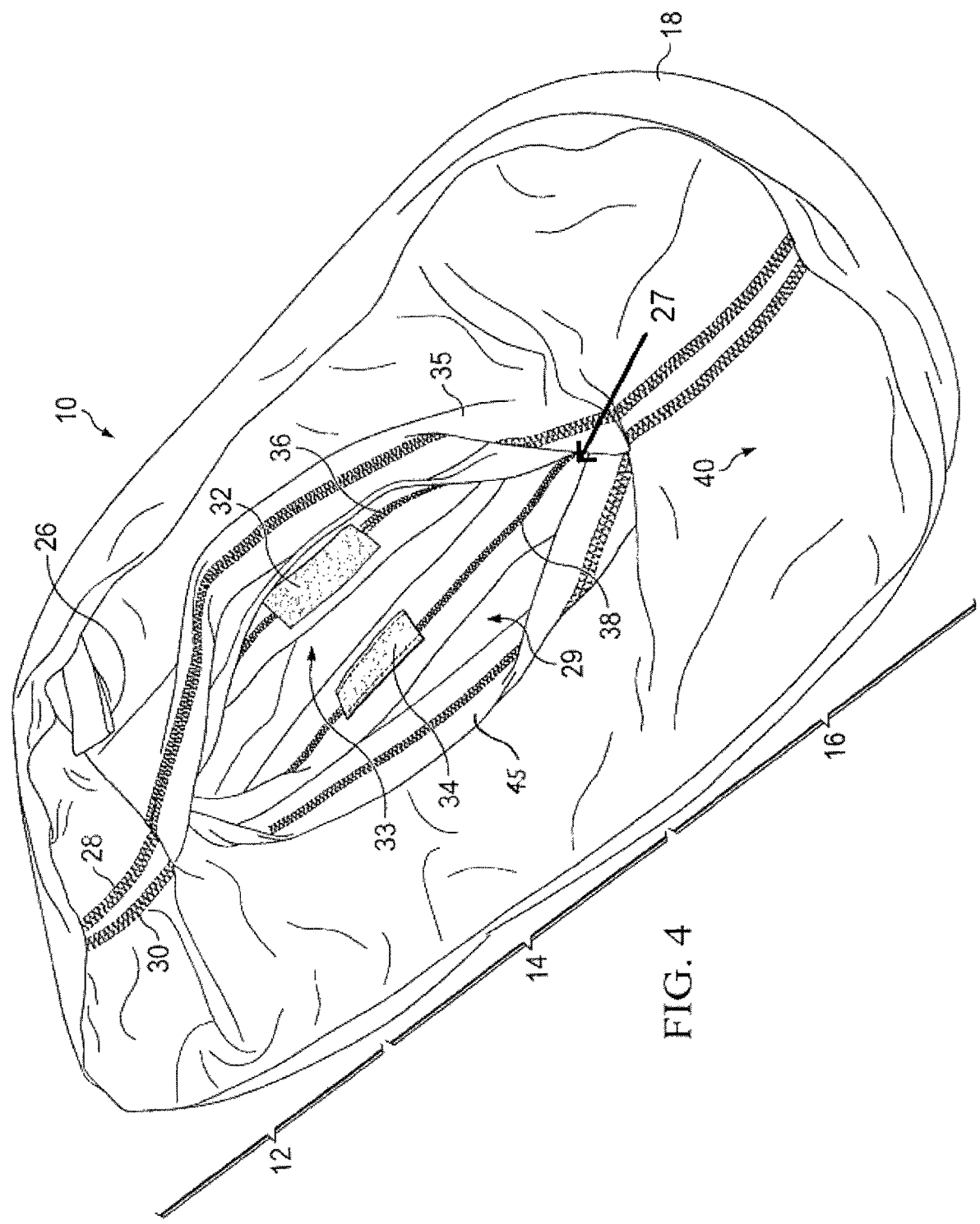
FIG. 4 is a bottom perspective view of the headrest cover of FIG. 1, showing the inner and outer chambers separated by an inner panel.

FIG. 4 shows a bottom perspective view of the headrest cover 10, to illustrate the bichambered internal configuration. The bichambered configuration consists of an inner chamber 33 and an outer chamber 29. The inner chamber 33 and outer chamber 29 are separated by an inner panel, which is composed of a top part 36 and a bottom part 38. An inner opening is defined through the inner panel between the top part 36 of the inner panel and the bottom part 38 of the inner panel. This inner opening leads to the inner chamber 33. An outer opening 27 is defined through the rear surface 40 of the headrest cover 10 underneath the top flap 35, as shown. In one embodiment, the inner opening into chamber 33 and the outer opening 27 into chamber 29 may each have a length between about 11 inches and about 13 inches. The inner chamber 33 may be configured to enclose padding, and the outer chamber 29 may be configured to accommodate, and hold the headrest cover to, a headrest portion of a chair. Optional means for closing the inner opening and the outer opening 27 may also be provided, such as the hook-and-loop fasteners 32, 34, or by a zipper, buttons, or other conventional methods. In this embodiment, the upper flap 35, lower flap 45, and bottom surface 40 are formed from the same material used to form the front surface of shroud 20. The flaps may be strengthened by a reinforced fold at the border of the outer opening 27, as indicated by stitching 28, 30.

Figure 5:
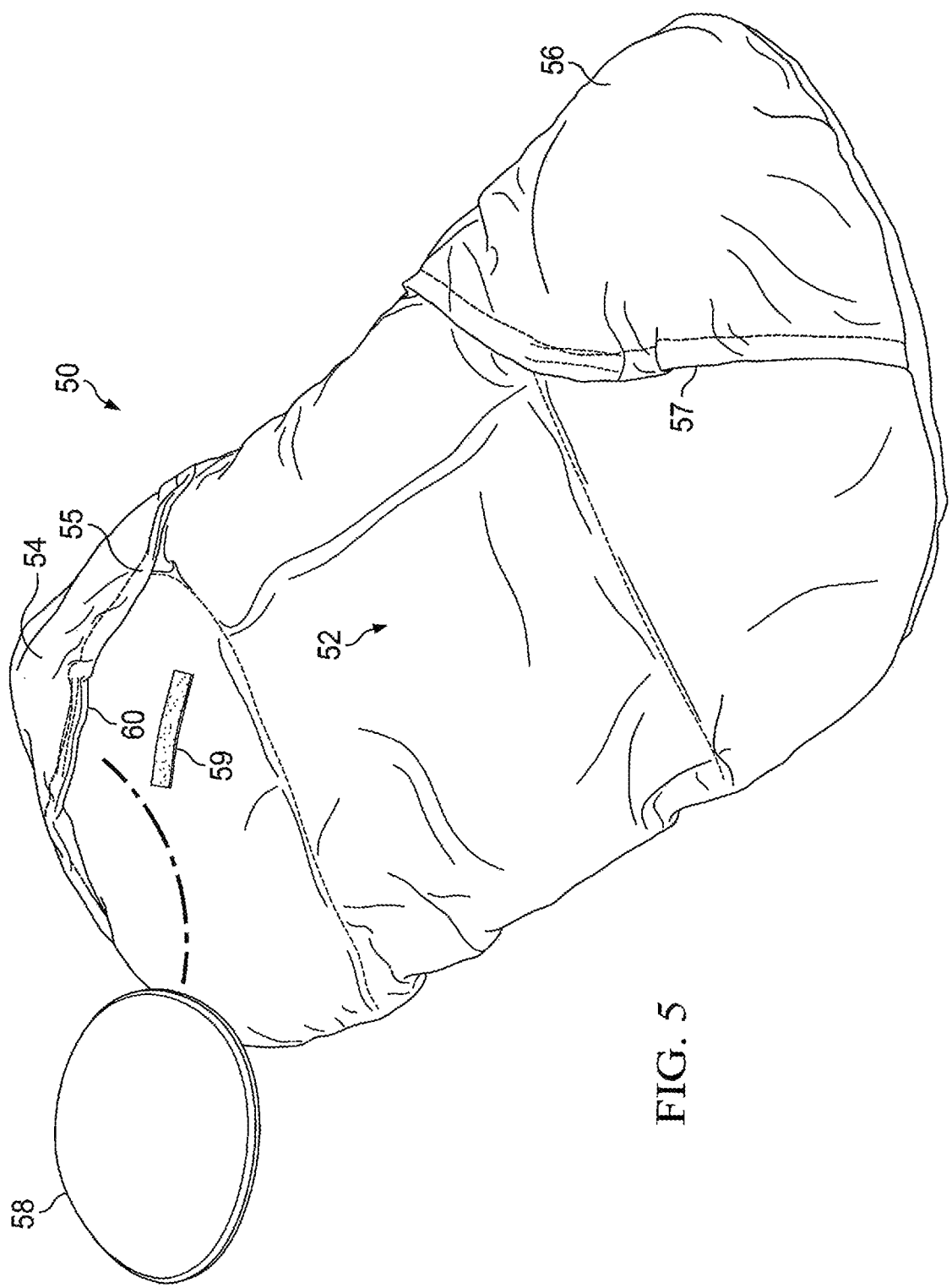
FIG. 5 is a perspective view of one embodiment of padding for the headrest cover of FIG. 1, which is shown enclosed within a pillowcase that has corner pockets for containing neck pads.

FIG. 5 shows a perspective view of one embodiment of padding for the headrest cover 10. In this figure the padding comprises a pillowcase 50 that contains a padding material such as foam rubber or other natural or synthetic pillow stuffing that conforms to the shape of its container. The pillowcase 50 may include corner pockets 54, 56 for containing neck pads 58. The surface 52 of the pillowcase 50 may be formed from the same fabric as the shroud 20, or from a different fabric. Whether or not enclosed in the pillowcase 50, the padding is inserted within the inner chamber 33 of the shroud 20 when a headrest cover according to the invention is fully assembled. Preferably, the padding has a size that substantially matches the volume and shape of the inner chamber 33, or that enables the padding to generally assume the volume and shape of the inner chamber 33 when stuffed therewithin. Reinforced flaps such as 57 may be stitched to strengthen the borders of the pockets 54, 56. Means for closing the pockets 54, 56 may also be provided, such as hook-and-loop fasteners 59, 60, or by a zipper, buttons, or other conventional methods.

Figure 6:
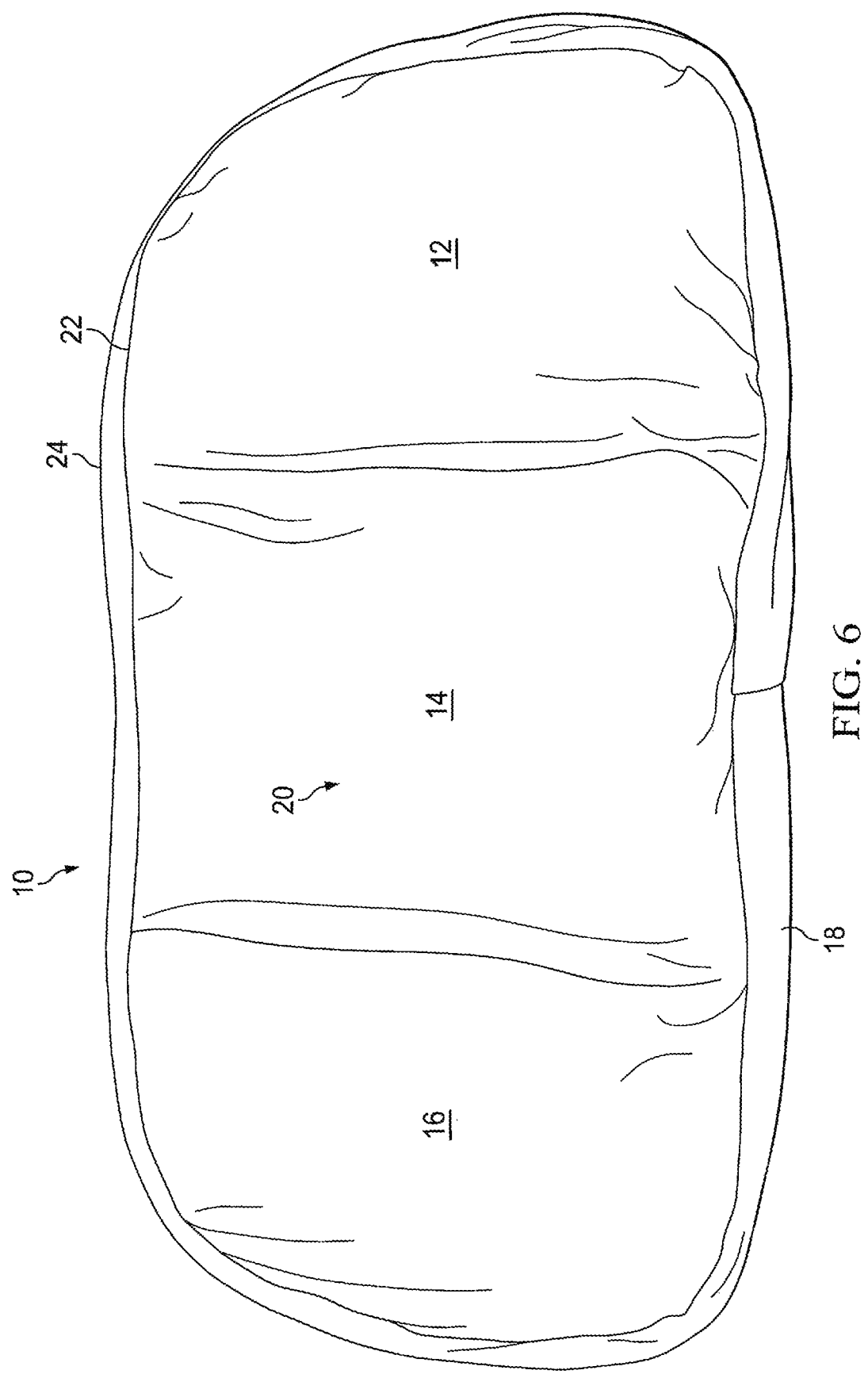
FIG. 6 is a frontal view of the headrest cover of FIG. 1.

FIG. 6 shows a frontal view of the headrest cover 10 in a fully extended, or unfolded condition. This view illustrates the generally rectangular shape of the headrest cover, and general divisions thereof into the left third 16, main third 14, and right third 12. This is the view that a user would see when facing the headrest when the headrest cover 10 is installed on the headrest of a chair. This view further illustrates how the shape of side wall 18 is somewhat formable, due to the flexibility of fabric used to manufacture the headrest cover, and to the formability of the enclosed padding. For example, though generally rectangular, the side wall 18 may define curved sides and corners around the rectangle to improve its fit to a particular headrest.

Figure 7:
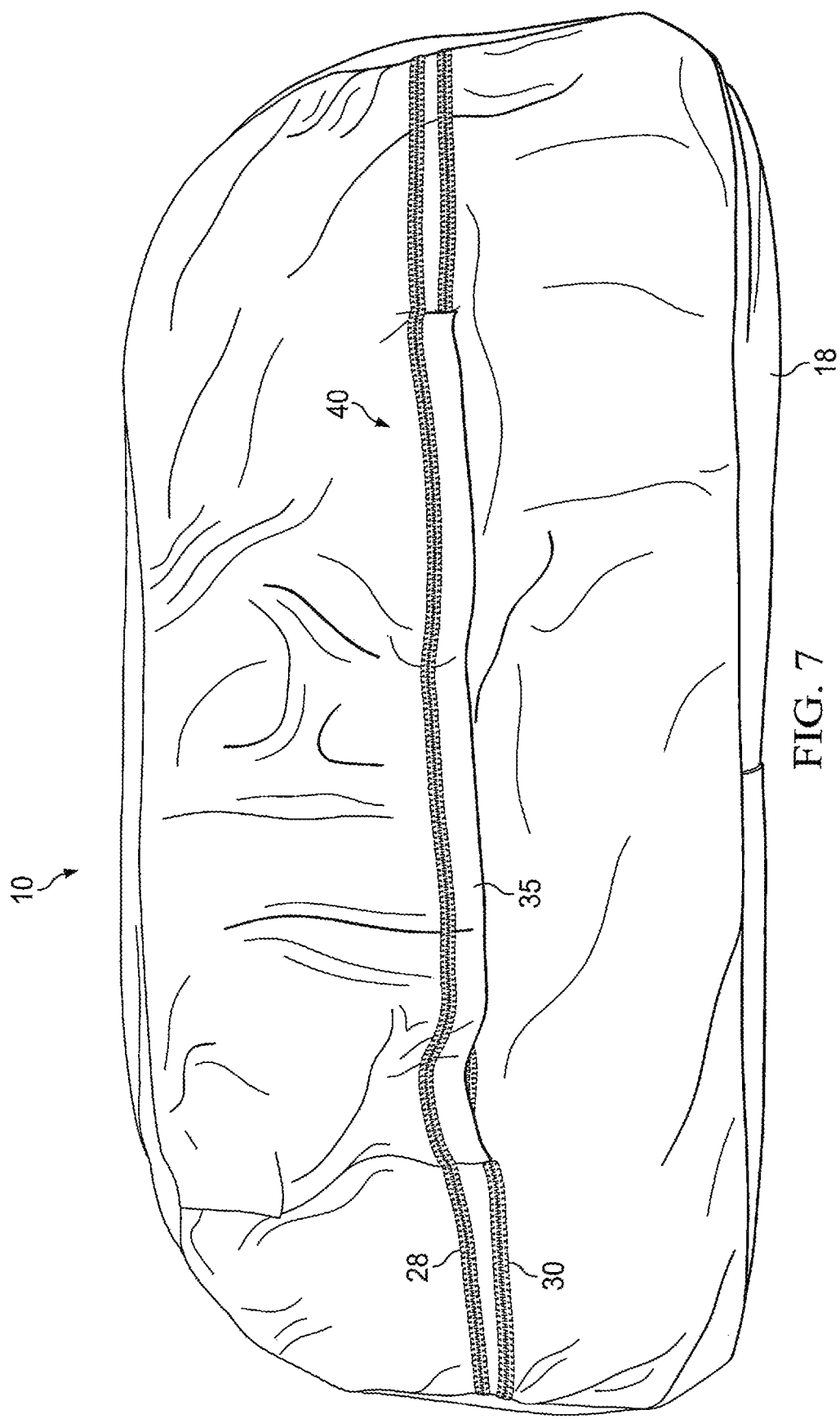
FIG. 7 is a rear view of the headrest cover of FIG. 1, shown with the outer opening closed.

FIG. 7 shows a rear view of the headrest cover 10 in a fully extended, or unfolded condition, with the outer opening 27 closed under the flap 35. This is the view that a user would see when facing the back of a headrest when the headrest cover 10 is installed on the headrest of a chair. Preferably, when flap 35 is closed, the headrest is completed enveloped by the headrest cover 10.

FIGS. 8 and 9 show, respectively, lower and upper side views of the headrest cover 10. These views illustrate the locations of bulging neck pads 58 on either side of the headrest cover at locations 64 and 66. The neck pads may be securely held within pockets 54 and 56 of pillowcase 50, as depicted in FIG. 5. Alternatively, shroud 20 may be configured with similarly located pockets for securely holding the neck pads. However configured, a headrest cover according to the invention may provide a means for attaching one or more neck pads to or within the shroud to provide added support for the head and neck of an individual seated in a chair having a headrest portion to which headrest cover 10 has been attached by means of the outer chamber of the shroud 20. Attaching structures for the neck pads can also include buttons, zippers, and hook-and-loop fasteners.

Figure 10:
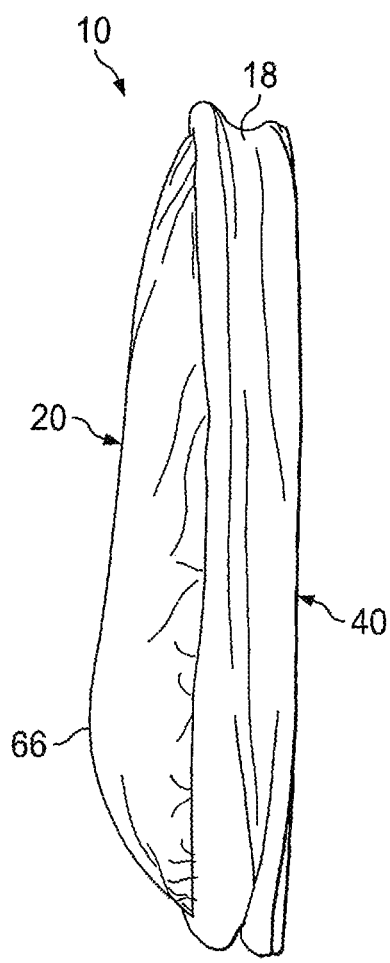
FIG. 10 is a right side view of the headrest cover of FIG. 1.
Figure 11:
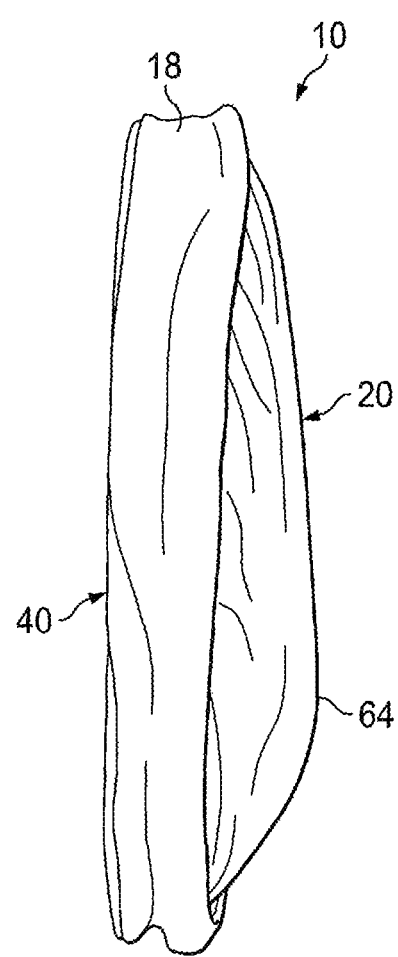
FIG. 11 is a left side view of the headrest cover of FIG. 1.

FIGS. 10 and 11 show, respectively, right side and left side views of the headrest cover 10, again illustrating the locations of bulging neck pads 58 on either side of the headrest cover at locations 64 and 66. The neck pads 58 are preferably made from a material that is soft and pliable for comfort, but that is also somewhat resilient to provide support for a user's head and neck. Silicone, or other synthetic rubbers or elastomers may be used for this purpose. In one embodiment, the neck pads 58 are dome-shaped.

In view of the foregoing disclosure, one skilled in the relevant art will appreciate that the present invention for a headrest cover, in a broad sense, may be expressed as a removable headrest cover for installation on a headrest portion of a chair. Furthermore, the invention may include a flexible shroud having an inner chamber and an outer chamber, the inner chamber separated from the outer chamber by an inner panel disposed within the outer chamber, the outer chamber accessible through an outer opening defined through an outer surface of the shroud, and the inner chamber accessible through an inner opening defined through the inner panel. Furthermore, the invention may include padding enclosed within the inner chamber.

The skilled artisan will further recognize that a more elaborate embodiment of the invention may be expressed as a headrest cover having a flexible shroud having an inner chamber and an outer chamber and the following additional features: The inner chamber contains padding and is separated from the outer chamber by an inner panel disposed within the outer chamber. The outer chamber s accessible through an outer opening defined through an outer surface of the shroud. The flexible shroud is configured to enclose a chair headrest within the outer chamber and, when removed from the chair, to be folded into multiple stacked portions and an outermost stacked portion, wherein the outermost stacked portion includes an end segment of the outer opening. And, wherein the end segment of the outer opening can at least partially enclose the multiple stacked portions within the outer chamber to form a pillow.

The skilled artisan will also recognize that another important aspect of the invention may be expressed as a headrest cover that includes a flexible shroud having an inner chamber and an outer chamber, wherein the inner chamber contains padding and is separated from the outer chamber y an inner panel disposed within the outer chamber, wherein the outer chamber is accessible through an outer opening defined through an outer surface of the shroud, wherein the flexible shroud is configured to enclose a chair headrest within the outer chamber and, when removed from the chair, to be rolled into a compressed volume that can be tucked into an end segment of the outer opening to form a pillow.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A removable headrest cover for installation on a headrest portion of a chair, comprising:
   a flexible shroud having an inner chamber and an outer chamber, the inner chamber separated from the outer chamber by an inner panel disposed within the outer chamber, the outer chamber accessible through an outer opening defined through an outer surface of the shroud, the inner panel defining an inner opening, the inner chamber accessible through the inner opening and the outer opening; and padding enclosed within the inner chamber.

2. The removable headrest cover of claim 1, wherein the padding has a size substantially matching the volume of the inner chamber.

3. The removable headrest cover of claim 1, further comprising a pillowcase enclosing the padding.

4. The removable headrest cover of claim 3, wherein the pillowcase further comprises one or more pockets formed on a surface of the pillowcase.

5. The removable headrest cover of claim 4, further comprising a neck pad at least partially enclosed in each of the one or more pockets.

6. The removable headrest cover of claim 5, wherein the neck pad comprises dome-shaped synthetic rubber.

7. The removable headrest cover of claim 1, wherein the flexible shroud is configured to enclose within the outer chamber a headrest portion of a passenger seat in a commercial airplane.

8. The removable headrest cover of claim 1, further comprising means for closing the inner opening.

9. The removable headrest cover of claim 8, wherein the closing means comprises a hook-and-loop fastener.

10. The removable headrest cover of claim 1, further comprising second means for closing the outer opening.

11. The removable headrest cover of claim 10, wherein the second closing means comprises a hook-and-loop fastener.

12. The removable headrest cover of claim 1 wherein the padding is foldable into thirds.

13. The removable headrest cover of claim 12 wherein the flexible shroud is configured to allow:
   (i) the headrest cover to be folded into a stack of thirds comprising a lower third, a middle third, and an upper third wherein each third includes at least a portion of the outer opening and wherein the outer opening is maintained inside the stack; and
   (ii) the lower third and the middle third to be tucked inside the outer opening portion of the upper third;

thereby converting the headrest cover into a trifolded pillow.

14. The removable headrest cover of claim 1 wherein the shroud comprises a polyurethane fabric.

15. The removable headrest cover of claim 1 wherein the flexible shroud defines a generally rectangular volume.

16. The removable headrest cover of claim 1 wherein the flexible shroud has a length between about 18 inches and about 20 inches.

17. The removable headrest cover of claim 1 wherein the outer opening has a length between about 11 inches and about 13 inches.

18. The removable headrest cover of claim 1 wherein the outer opening is substantially centered on the outer surface of the shroud.

19. The removable headrest cover of claim 1 wherein the inner opening has a length between about 11 inches and about 13 inches.

20. The removable headrest cover of claim 1 wherein the inner opening is substantially centered on the inner panel.

* * * * *